UNITED STATES PATENT OFFICE.

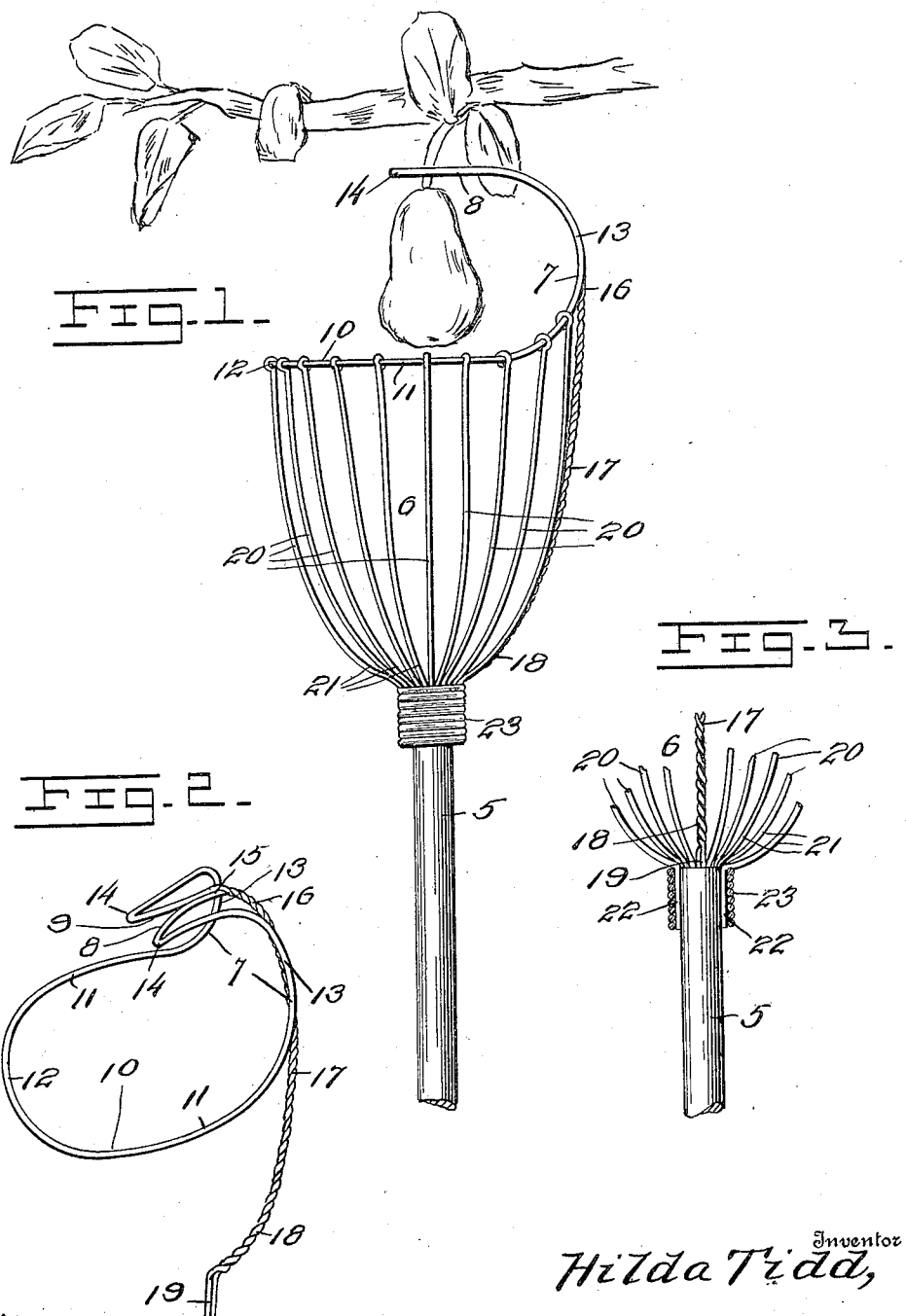

HILDA TIDD, OF GEORGETOWN, MASSACHUSETTS.

FRUIT-PICKER.

No. 914,205.   Specification of Letters Patent.   Patented March 2, 1909.

Application filed November 20, 1908. Serial No. 463,630.

*To all whom it may concern:*

Be it known that I, HILDA TIDD, a citizen of the United States, residing at Georgetown, in the county of Essex and State of Massachusetts, have invented certain new and useful Improvements in Fruit-Pickers, of which the following is a specification.

This invention relates to fruit culture and more particularly to fruit pickers, and has for its object to provide a picker with which fruit may be easily and quickly removed from trees, and which will be furthermore so arranged that it may be made from wire at a low figure.

A particular object is to provide a structure producing proper strengthening members for the fruit engaging jaws.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevation of the present fruit picker engaged with a pear. Fig. 2 is a perspective view showing the arrangement of the mouth loop, the jaws, and the jaw strengthening member. Fig. 3 is a detail view showing the manner of attaching the longitudinal wires to the handle.

Referring now to the drawings, there is shown a fruit picker comprising a handle 5 having a basket 6 mounted upon its upper end, the basket being open at its top and having upwardly and inwardly curved portions 7 carrying convergent jaws 8 and 9. The basket includes a mouth loop 10 of wire, this loop being formed of a length of wire curved to form side portions 11 and a forward bight portion 12. The portions 11 at their rearward ends, are curved upwardly and forwardly as shown at 13, and are then bent at acute angles as shown at 14, and converged rearwardly to produce the jaws 8 and 9. These jaws meet at a crotch 15, and beyond this crotch the two portions of the wire are twisted together as shown at 16, being carried downwardly as indicated at 17 and then curved forwardly as indicated at 18. The extremity of the twisted portions of the wire is bent downwardly as indicated at 19, and rests against the side of the handle 5. This twisted portion is thus of greater rigidity than the portion 13, and acts to support the jaws 8 and 9.

A plurality of vertically extending wires 20 are engaged at their upper ends with the loop 10, these wires being carried downwardly and having their lower portions curved inwardly as shown at 21, the extremities of these wires being bent downwardly as shown at 22 and disposed against the side of the handle 5. A wrapping wire 23 is then engaged around the extremities 22 of the wires 20, confining these extremities and the extremity 19 to the handle, and thus forming a socket for the handle.

As will be readily understood, there is some resilience in the portion 13 and the twisted portion 16, so that if the picker is used in gathering ripe fruit, the tendency of the jaws to spring upwardly instead of pulling the fruit from the tree will indicate the greenness of the fruit. On the other hand, the portion 16 sufficiently prevents extreme upward movement of the jaws to allow green fruit to be picked when it is desired to do so.

What is claimed is:

A fruit picker comprising a basket consisting of a horizontally extending mouth loop, said loop being formed of a length of wire curved to present side portions and a forward bight portion, the side portions having their rearward ends curved upwardly and forwardly and then bent inwardly at an acute angle and converged rearwardly to form jaws, the said wire beyond the jaws being twisted together and extended downwardly between the upwardly curved portions of the wire, a plurality of vertically extending wires secured at their upper ends to the loop, said wires being extended downwardly and inwardly, and a handle secured to said downwardly extending portions.

In testimony whereof I affix my signature, in presence of two witnesses.

HILDA TIDD.

Witnesses:
 GEORGE L. METCALF,
 ROBERT F. METCALF.